Nov. 20, 1962    R. A. GANZE    3,064,793
FRUIT CENTERING DEVICE AND METHOD THEREFOR
Filed July 19, 1957    2 Sheets-Sheet 1

INVENTOR.
RONALD A. GANZE
BY
ATTORNEY

Nov. 20, 1962    R. A. GANZE    3,064,793
FRUIT CENTERING DEVICE AND METHOD THEREFOR
Filed July 19, 1957    2 Sheets-Sheet 2

INVENTOR.
RONALD A. GANZE
BY
ATTORNEY

United States Patent Office 3,064,793
Patented Nov. 20, 1962

3,064,793
FRUIT CENTERING DEVICE AND METHOD
THEREFOR
Ronald A. Ganze, Marion, N.Y., assignor to F. B. Pease
Company, Rochester, N.Y., a corporation of New York
Filed July 19, 1957, Ser. No. 672,948
4 Claims. (Cl. 198—33)

This invention relates to an improvement in a fruit treating machine and more particularly, to a method of centering fruit and a fruit centering device for a paring, coring, and similar machine used in the treatment of fruit which will hereinafter be referred to as a paring machine which assists in locating the fruit properly in the machine so that the paring, trimming and coring operations may be effectively performed on the fruit.

Many machines are in use today which are employed to pare and core fruit such as pears, apples and the like. One such machine, with which this invention is particularly concerned and represents an improvement thereon is an apple paring machine described in the J. W. Pease Patent No. 2,107,339. In the operation of this machine, and machines of a similar type, a piece of fruit such as an apple is placed manually, preferably stem up, in a receptacle or feed cup on the machine which subsequently impales the apple on a forked support in a predetermined position for effective treatment by the paring, trimming and coring devices contained in the machine.

As the paring, trimming and coring devices are arranged to operate in a definite path, it is highly desirable that the apple always occupy a definite position on the machine relative to these devices. In the machine of the above mentioned patent, the apple is properly treated by these devices if it is impaled with its core in axial alignment with the fork and the positioning of the apple in the cup determines the position it will occupy when impaled on the fork.

As the placing of the apple in the cup is a manual operation which is usually performed rapidly and continuously by an operator, the apple is often improperly located in the cup, as a result of such factors as variation in apple shapes, fatigue, human error, and the like. Furthermore, often a single operator is required to feed apples to a plurality of feed cups adding considerably to the likelihood of improper placement of the apples in the cup. Improper placement therefore would mean that the apple would be impaled on the fork with its core axis canted somewhat from the axis of the fork. This means that the corer would not move coaxially through the core and as the axis of the core of substantially all apples terminates in a bud and stem at opposite ends, some, if not all, of the stem and bud would remain on the apple together with parts of the core. Additionally, the entire peel would not be removed by the trimming and paring devices. When the apple is subsequently processed these unremoved fragments result in a highly objectionable product.

Accordingly, a primary object of this invention is to provide a new and novel fruit centering device for paring machines.

Another object of this invention is to provide a new and novel centering device for an apple paring machine which assists in positioning each apple placed in the machine so that its core axis will subsequently lie substantially coaxial with the axis of the fork on which the apple is impaled permitting the apple to be effectively pared and cored by the paring, trimming and coring devices in the machine.

A further object of this invention is to provide a new and novel centering device for an apple paring machine which corrects improper placement of the apple by the operator in the machine and which is substantially unaffected by the configuration of the apple.

A still further object of this invention is to provide a new and novel centering device for an apple paring machine which may be adjusted both for alignment with the machine and for accommodating apples of different weights.

Still another object of this invention is to provide a new and novel method for centering fruit in a fruit treating machine.

This invention further contemplates the provision of a new and novel apple centering device which is simple in construction, inexpensive to manufacture and which substantially eliminates misalignment of the apple in the machine and the attendant failure of the machine to remove objectionable apple fragments such as peel, bud and stem particles from the apple.

Other objects and advantages of this invention will be particularly set forth in the claims and will be apparent from the following description, when taken in connection with the accompanying drawings, in which:

Figure 1:
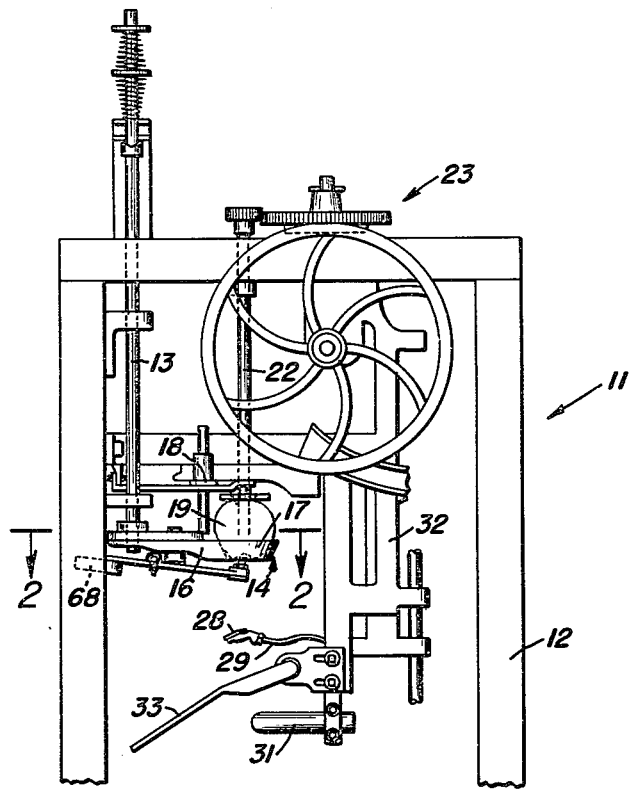
FIG. 1 is a partial elevation view of an apple paring machine which incorporates the invention.

Referring now to FIG. 1 there is shown an apple paring, trimming and coring machine similar to that described in the Pease Patent No. 2,107,339 and which this invention represents an improvement thereof. It should be understood that although this invention may be employed in conjunction with any similar type of fruit treating machine for paring fruit of various types having an indentation at an end of its core, it is particularly applicable for use with an apple paring and coring machine such as described in the above mentioned patent and hereinafter its operation will be described in reference to the treatment of apples only.

Figure 5:
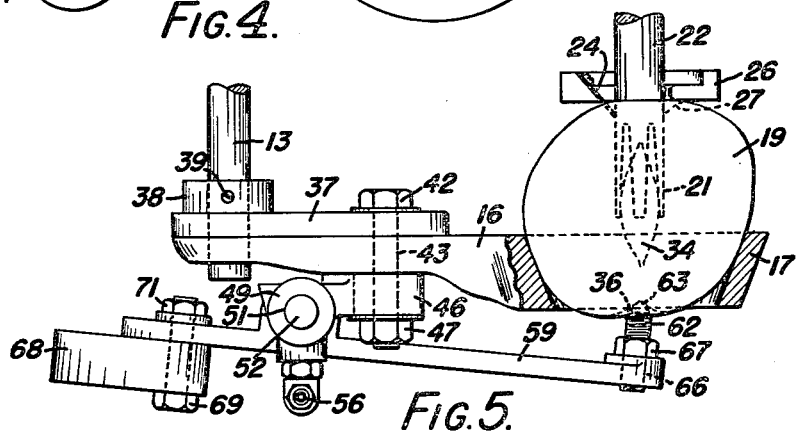
FIG. 5 is a side view partially in section of the apparatus of FIG. 2, illustrating an apple of relatively small size in the feeding mechanism and impaled on the fork of the machine.

As more particularly described, the apple paring machine, designated generally in FIG. 1 by the numeral 11, comprises a frame 12 on which is supported a vertically reciprocating rod 13. The lower end of the rod 13 carries a feed device designated generally by the numeral 14 and comprising an arm 16, terminating at one end in an apple receiving receptacle or feed cup 17. The rod 13 is arranged for limited rotation by means of a reciprocating draw bar 18 so that the feed device may be moved outwardly and downwardly from the position of FIG. 1. The feed cup 17 is therefore located in a convenient position for the operator who feeds apples to the machine by manually placing an apple 19 within the cup. As will be more fully explained hereinafter, the apple 19 is properly placed in the cup 17 so that the axis of its core will line in a substantially vertical direction with the stem end up as shown in FIG. 5.

When the apple 19 has been placed in the cup 17, the rod 13 is rotated to a limited extent by the draw bar 18 and moved upward to impale the apple on the fork 21 (FIG. 5) of a rotatable spindle 22. The fork 21 is preferably formed on the lower end of the spindle 22 which is positioned on the machine so that the common axis of the fork and spindle extends in a substantially vertical direction. The spindle 22 is arranged to be driven through a gear mechanism designated generally by the numeral 23. In order that the paring machine function properly, the apple must be placed in the cup 17 so that it will be impaled on the fork 21 in coaxial relationship therewith. During this apple impaling movement, an angularly disposed trimming knife 24 suitably mounted on a yoke 26 as shown best in FIG. 5, pierces the apple adjacent its indentation at its upper stem end 27.

The feed device 14 is then moved back to the previously described loading position leaving the apple 19 in the impaled position on the fork 21. The spindle 22 is then rotated so that the trimming knife 24 removes a ring from the apple adjacent the stem end 27 which a paring knife 28 (FIG. 1) will not be able to reach. As the apple 19 continues to rotate the paring knife 28 mounted on an arm 29 is applied to the apple. The knife 28 travels in an arcuate path as described in the above mentioned patent to remove the peel.

Meanwhile, a coring knife 31 is pivoted upwardly into axial alignment with the fork 21 upon the rising of carriage 32 and through the employment of suitable cams (not shown). The coring knife 31 thus enters the apple and cuts the core away from the remainder of the apple. As the knife 31 is moved back to the position of FIG. 1, the apple is carried with it to a point where a doffer 33 wipes the pared apple from the coring knife and the apple falls into any suitable receptacle (not shown) below the machine. The core in the meantime has been ejected from the coring knife by means such as an ejector rod (not shown) centrally positioned within the spindle 22.

As has been explained, the apple treating devices of the machine 11 such as the trimming knife 24, the paring knife 28, and coring knife 31, are arranged to operate in a relatively definite path. The apple 19 should therefore be located in a definite position on the spindle 22 relative to these devices so as to be properly treated during the operation of the machine. For example, the coring knife 31 and fork 21 cooperate in coaxial relationship so that unless the axis of the apple core 34 (FIG. 5) lies on the axis of the fork 21 when the apple is impaled, portions of the core would remain in the apple after the coring operation.

As is well known, the apple core 34 terminates at each end of the apple in the stem end 27 and a bud end 36 both of which ends are intended and must be removed together with the core. Therefore, proper removal of the core 34 would result in the coring knife removing all of the stem and material centering around the apple ends 27, 36. Furthermore, with proper alignment of the apple 19 on the fork 21, the trimming knife 24 will remove portions of the apple peel in the margin of the indentation at the stem end which are not accessible to the paring knife 28.

It can easily be seen, therefore, that if the operator does not place the apple 19 in the feed cup 17 so that the axis of the core 34 is vertical and will align coaxially with the fork 21 when impaled thereon, fragments of the core may be left on the treated apple as well as undesirable portions of the stem and bud such as hair-like particles and untrimmed portions of peel adjacent the stem end. Thus, in the ultimate product produced from the apple, these fragments will remain, particularly in products such as applesauce where straining is of little value in eliminating these fragments due to the relatively large mesh employed in current processing techniques.

Figure 2:
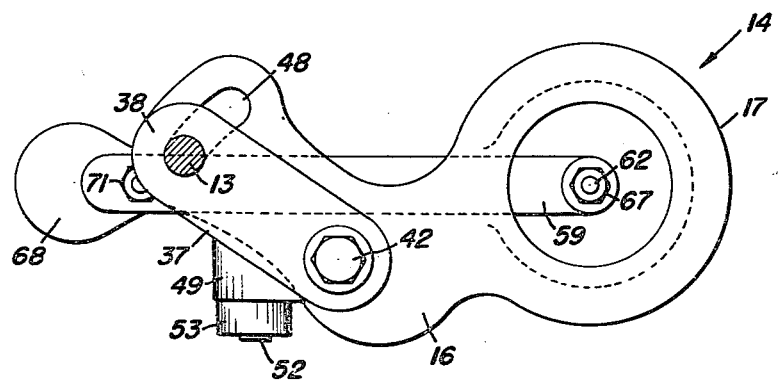
FIG. 2 is an enlarged sectional view taken substantially along the line 2—2 of FIG. 1 illustrating the apple centering device of the invention and a portion of the associated apple feeding mechanism.

In carrying out the invention, therefore, means have been provided to insure that the apple core 34 will be located in axial alignment with the fork 21 when its is impaled thereon. More specifically, as shown best in FIGS. 2, 3, the arm 16 of the feed device 14 is secured to the vertical rod 13 by means of a link 37. As shown in FIG. 2, the link 37 is provided at one end with an upstanding boss or sleeve 38 through which the rod 13 extends and the sleeve is secured to the rod 13 by means such as a set screw 39. The other end of link 37 is connected to the central portion of the arm 16 by means of a bolt 42 extending through a bore 43 in the arm 16 and an elongated slot 44 (FIG. 4) in a mounting bracket 46 arranged beneath the arm. Suitable means such as a nut 47 is preferably used to secure the bracket 46 and link 37 in a fixed position against the feed device arm 16 but if desired the bracket 46 may be formed integral with the feed device 14.

The lower end of rod 13 extends through an arcuate slot 48 in the arm 16 (FIG. 4) so that when the bolt 42 is loosened, the feed device 14 may be pivoted around bolt 42 relative to the link 37 with the rod end sliding in the slot 48 for arcuate alignment of the feed cup 17 in the machine 11. It should be understood that the cup 17 is aligned generally by releasing the set screw 39 and pivoting the link 37 together with the cup 17 until the cup is aligned angularly relative to the rod 13.

Figure 4:
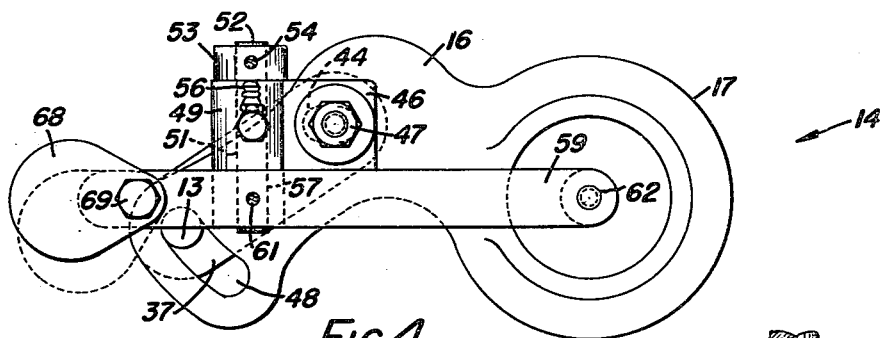
FIG. 4 is a bottom view of the apparatus of FIG. 2.

As specifically illustrative of the construction of the invention, the bracket 46 is provided with a transversely extending barrel or boss 49 having a bore 51 as shown best in FIG. 4. A freely rotatable pin 52 is journaled within the bore 51 and a stop collar 53 is fixedly secured to one end of the pin by means such as a set screw 54. Preferably a fitting 56 is provided on the boss 49 through which lubricant for the pin 52 may be applied in the conventional manner.

Figure 3:
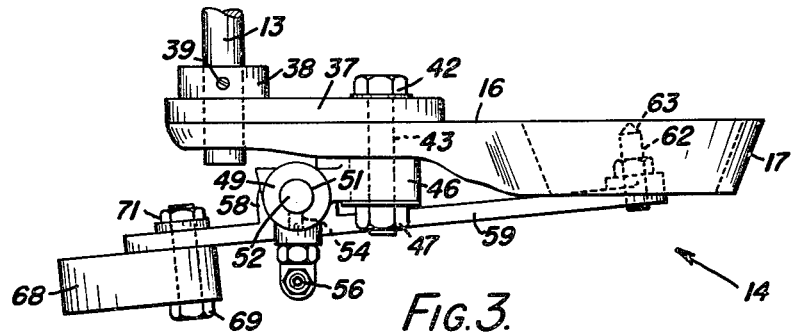
FIG. 3 is a side elevation view of the apparatus of FIG. 2.

As shown in FIGS. 2-4, the other end of pin 52 is received within the bore 57 of a centrally located boss 58 on a centering arm 59. The pin 52 is fixedly secured to the boss 58 by means such as a set screw 61. The arm 59 extends generally longitudinally with the feed device 14.

An upstanding pin 62 having an upper end 63 preferably tapered as shown in FIG. 4 is mounted on the end of the arm 59 adjacent the feed cup 17. Preferably, the pin 62 extends within a threaded bore 66 in the end of arm 59 and may be secured in a fixed position after vertical adjustment by means such as a lock nut 67. The arm 59 is arranged to position the pin end 63 at generally the center of the feed cup 17. An accurate adjustment of the position of pin 62 so that it will lie substantially at the center of cup 17 may be made by releasing nut 47 and moving the bracket 46 relative to bolt 42 along the elongated slot 44. As previously explained the cup position may be set prior to adjustment of the position of pin 62 by moving the link 37 as well as the lower end of rod 13 to a selected position in the arcuate slot 48.

A counterweight 68 (FIGS. 4, 5) is mounted on the opposite end of the arm 59 from the pin 62 and may be secured thereto by means such as bolt 69 and cooperating nut 71. The counterweight 68 is shaped in a manner similar to that shown in FIG. 4 so that it may be moved adjustably to a selected position such as the dotted line position of FIG. 4 when nut 71 is loosened. The counterweight 68 thus applies a downward force on the arm 59 to move the pin 62 upwardly in the feed cup 17. As can be easily seen the amount of force exerted by the counterweight is determined by the radial position it occupies relative to the bolt 69.

As specifically illustrative of the practice of this invention, it is well understood that virtually all apples contain a bud or blossom end 36 and a stem end 27 which are indented to form a depression or pit having inwardly and downwardly curving side walls or margins. Furthermore, the bud and stem ends 36, 27 lie substantially at opposite ends of the axis of the apple core 34. Through the novel operation of this invention, the pin 62 is adapted to use these indentations and their relationship with the core 34 to insure that the core 34 is in axial alignment with the fork 21 when the apple is impaled thereon.

The apple 19 is placed by an operator in the cup 17 in such a manner that the pointed end 63 of pin 62 yieldingly contacts the margins of the indentation at either the stem or bud end. Preferably, the apple is located so that the bud end 36 contacts the pointed pin end 63 as shown in FIG. 5 and the stem end 27 is at the top. It should be understood that the operator need only center the apple so that the pin end 63 will contact the apple indentation at some point along its inwardly sloping margins or side walls for if the pin end 63 contacts the apple at some other location remote from the indented end, centering of the apple in accordance with the practice of the invention cannot be accomplished. In other words, some limited alignment error by the operator in placing the apple 19 in the cup 17 is permitted such as that which might normally occur from haste, fatigue, or human error. Gross carelessness by the operator however would render the centering device inoperative.

As the operator releases the apple 19 in the cup 17, the apple moves downwardly of its own weight to seat itself within the tapered side walls (FIGS. 5, 6) of the cup 17 while at the same time the pin end 63, if not already at the center of the indented end will cam or rotate the apple along the curvilinear sides or margins of the indentation as a result of the apple weight as the arm 59 is being pivoted in a clockwise direction as viewed in FIG. 5. The apple 19 is then rotated by the force of this camming action as it moves downward and prior to the apple seating in the cup it has ceased to rotate and the pin end 63 is lodged in the center of the indentation. In the seated position in the cup 17 the apple has its core in vertical axial alignment with the cup as the center of the bud end indentation lies at the end of the core axis regardless of the configuration of the apple.

It will now be understood that with the pin 62 located at the center of the cup and the feed cup 17 adjusted so as to lie coaxially with the fork 21 when impaling the apple thereon, the apple will be impaled with its core in axial alignment with the fork so that the apple may be properly treated by the various devices on the machine. The apple 19 is therefore properly pared, trimmed, and cored leaving no objectionable fragments on the apple which might later appear in the processed product.

It should also be understood that the counterweight 68 has been adjustably positioned for the approximate weight of an individual apple in the load to be treated by the machine. In other words, each apple should be able to seat completely in the cup 17 against the loading action of the counterweight but the counterbalancing force should not be so low as to permit the apple to seat so rapidly that the centering action could not take place.

Figure 6:
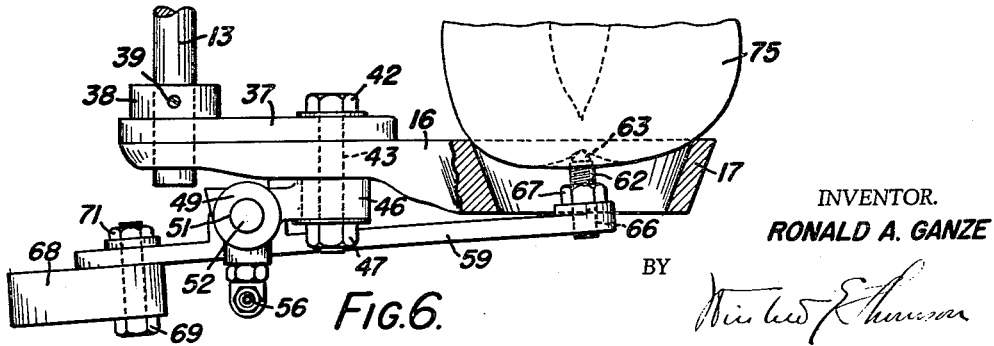
FIG. 6 is a view similar to FIG. 5 illustrating an apple of relatively large size positioned in the feeding mechanism.

FIG. 6 illustrates the use of the invention with an apple 75 of relatively large size where it can be seen that the apple would not seat as low in the cup 17 as in the apple 19 of FIG. 5. As shown in FIG. 6, the pin 62 is not depressed by the larger apple to the extent of the smaller apple but the same centering action is obtained. Furthermore, it should be understood that although the pin 62 travels in a slightly arcuate path as it is moved downwardly by the apple, the pointed end 63 will always lie sufficiently close to the vertical axis of the cup 17 so that the proper core alignment is obtained.

While there has been shown and described the preferred forms of mechanisms of the invention by which the method may be carried out, it will be apparent that various changes and modifications may be made therein, particularly in the form and relation of parts, without departing from the spirit of the invention as set forth in the appended claims.

I claim:

1. An apple coring and paring machine comprising, in combination, a rotatable spindle, means for rotating said spindle, said spindle having impaling means on the end thereof, a cup for supporting an apple, means for moving said cup to a loading position to enable the placement of an apple therein, means for moving said cup into alignment with the spindle, yielding means associated with said cup and arranged to be depressed by an apple as it is loaded in said cup, said yielding means being arranged to contact the margins of an indentation at one end of the core of said apple and axially align the core with said spindle and means for impaling the apple on said impaling means with said core in axial alignment with said spindle.

2. An apple coring and paring machine in accordance with claim 1 wherein said yielding means comprise a pivotal arm associated with said cup, an upstanding pin mounted on one end of said arm below said cup and arranged for movement centrally into said cup, a counterweight mounted on the other end of said arm for normally locating said pin in said cup, said pin being arranged to contact the margins of an indentation in said apple at the end of its core and move downwardly against the force of said counterbalance by the weight of an apple placed in said cup to axially align the core with said spindle.

3. In a fruit processing machine including, in combination with a spindle means, a fruit receiving cup adapted to be manually fed, means supporting said fruit receiving cup and operable to move said fruit receiving cup to loading position removed from alignment with said spindle means and to position the cup at the spindle means in alignment therewith, and a centering device comprising a pivotal centering arm associated with said cup, said arm having an upstanding pin at one end thereof, a counterweight mounted on the other end of said arm, said counterweight normally pivoting said arm to move said pin centrally upward into said cup, said pin being arranged to contact the margins of an indentation in the fruit placed in the cup and to orient said fruit during the downward movement of said pin so that the axis of the core of the fruit extends in a substantially vertical direction.

4. In a fruit processing machine including, in combination with a spindle means, a fruit receiving cup adapted to be manually fed from above and the fruit being seated in the cup solely by gravity, means supporting said fruit receiving cup and operable to move said fruit receiving cup to loading position removed from alignment with said spindle means and to position the cup at the spindle means in alignment therewith, said cup being fixed with respect to said means supporting said fruit receiving cup, and a centering device comprising a pivotal centering arm associated with said cup, said arm having an upstanding pin at one end thereof, a counterweight mounted on the other end of said arm, said counterweight normally pivoting said arm to move said pin centrally upward into said cup, said pin being arranged to contact the margins of an indentation in the fruit placed in said cup and to orient said fruit during the movement of said pin so that the axis of the core of said fruit extends in a substantially vertical direction.

References Cited in the file of this patent

UNITED STATES PATENTS

| | | |
|---|---|---|
| 2,107,339 | Pease | Feb. 8, 1938 |
| 2,225,979 | Carroll | Dec. 24, 1940 |
| 2,268,696 | Carroll | Jan. 6, 1942 |
| 2,459,368 | Dunn | Jan. 18, 1949 |
| 2,468,255 | Dunn | Apr. 26, 1949 |
| 2,574,761 | Rutherford | Nov. 13, 1951 |
| 2,655,247 | Carroll et al. | Oct. 13, 1953 |
| 2,685,899 | Ewald et al. | Aug. 10, 1954 |
| 2,742,067 | Coons et al. | Apr. 17, 1956 |
| 2,769,521 | Hait | Nov. 6, 1956 |